(12) United States Patent
Foster

(10) Patent No.: US 6,421,930 B1
(45) Date of Patent: Jul. 23, 2002

(54) PISTON RING LOCATING SYSTEM

(76) Inventor: John R. Foster, HC81 Box 3314, Searsmont, ME (US) 04973

( * ) Notice: Subject to any disclaimer, the term of this patent is extended or adjusted under 35 U.S.C. 154(b) by 0 days.

(21) Appl. No.: 09/543,496

(22) Filed: Apr. 6, 2000

(51) Int. Cl.$^7$ ................................................ G01B 3/46
(52) U.S. Cl. ...................... 33/605; 33/645; 33/DIG. 15
(58) Field of Search .......................... 33/645, 533, 600, 33/601, 605, 613, 644, DIG. 15

(56) References Cited

U.S. PATENT DOCUMENTS

| | | | | |
|---|---|---|---|---|
| 1,566,083 A | * | 12/1925 | Forslund | 33/601 |
| 1,789,593 A | * | 1/1931 | Murphy | 33/605 |
| 1,888,454 A | * | 11/1932 | Edson | 33/605 |
| 2,648,136 A | * | 8/1953 | Lanigan | 33/605 |
| 5,038,449 A | * | 8/1991 | Huggins, Jr. | 33/605 |

FOREIGN PATENT DOCUMENTS

FR 895269 * 1/1945 ................... 33/605

* cited by examiner

*Primary Examiner*—Christopher W. Fulton

(57) ABSTRACT

A piston ring locating system includes a resilient ring fabricated in a generally circular configuration having a short height and a length of between about 2 inches and 5 inches with overlapping free ends. One of the ends has a slight bend there adjacent for fitting inside the opposite end. The rings are outwardly biased resiliently to allow varying the circumference of the ring as a function of the cylinder in which it is to be placed. The ring thus forms an interior surface and an exterior surface positionable within the cylinder in which it is to be placed. The ring has a top edge and a bottom edge constituting an abutment surface. Projection means extends outwardly from the exterior surface to a short distance and is adapted to be located on the upper edge of the block of the cylinder with which it is to be utilized.

12 Claims, 3 Drawing Sheets

PISTON RING LOCATING SYSTEM

BACKGROUND OF THE INVENTION

1. Field of the Invention

The present invention relates to a piston ring locating system and more particularly pertains to conveniently squaring and locating a piston ring positioned within a recipient cylinder.

2. Description of the Prior Art

The use of piston ring locators of known designs and configurations is known in the prior art. More specifically, piston ring locators of known designs and configurations previously devised and utilized for the purpose of positioning a piston ring within a recipient cylinder through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,566,083 to Forslund discloses an engine valve setting gauge. U.S. Pat. No. 5,038,449 to Huggins, Jr. discloses a piston ring end gap tool. Lastly, U.S. Pat. No. 5,979,071 to Kim discloses a piston ring gap measuring device for a vehicle.

While these devices fulfill their respective, particular objectives and requirements, the aforementioned patents do not describe a piston ring locating system that allows conveniently squaring and locating a piston ring positioned within a recipient cylinder.

In this respect, the piston ring locating system according to the present invention substantially departs from the conventional concepts and designs of the prior art, and in doing so provides an apparatus primarily developed for the purpose of conveniently squaring and locating a piston ring positioned within a recipient cylinder.

Therefore, it can be appreciated that there exists a continuing need for a new and improved piston ring locating system which can be used for conveniently squaring and locating a piston ring positioned within a recipient cylinder. In this regard, the present invention substantially fulfills this need.

SUMMARY OF THE INVENTION

In view of the foregoing disadvantages inherent in the known types of piston ring locators of known designs and configurations now present in the prior art, the present invention provides an improved piston ring locating system. As such, the general purpose of the present invention, which will be described subsequently in greater detail, is to provide a new and improved piston ring locating system and method which has all the advantages of the prior art and none of the disadvantages.

To attain this, the present invention essentially comprises a plurality of resilient rings are provided. Each ring is fabricated of stainless steel in a generally circular configuration. Each ring has a short height of about 1 inch and a length of between about 2 inches and slightly greater than 5 inches. The preferred sizes are a small ring for 2 to 2.5 inch diameter cylinders, a medium ring for 2.5 to 3.5 inch diameter cylinders, and a large ring for 3.5 to 5.0 inch diameter cylinders. Each ring has overlapping free ends. One of the ends has a slight bend there adjacent for fitting inside the opposite end. The rings are outwardly biased resiliently to allow varying the circumference of each ring as a function of the cylinder in which it is to be placed. Each ring thus forms an interior surface and an exterior surface positionable within the cylinder in which it is to be placed. Each ring has a top edge and a bottom edge which constitutes an abutment surface. Projection means are next provided. The projection means extend outwardly from the exterior surface to a short distance. The projection means is adapted to be located on the upper edge of the block of the cylinder with which it is to be utilized to accurately allow the insertion of the ring to a predetermined depth with the bottom edge in contact with the upper edge of a piston ring to effect its proper depth determination within the cylinder as well as the perpendicular squaring of the piston ring with respect to the axis of the cylinder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved piston ring locating system which has all of the advantages of the prior art piston ring locators of known designs and configurations and none of the disadvantages.

It is another object of the present invention to provide a new and improved piston ring locating system which may be easily and efficiently manufactured and marketed.

It is further object of the present invention to provide a new and improved piston ring locating system which is of durable and reliable constructions.

An even further object of the present invention is to provide a new and improved piston ring locating system which is susceptible of a low cost of manufacture with regard to both materials and labor, and which accordingly is then susceptible of low prices of sale to the consuming public, thereby making such piston ring locating system economically available to the buying public.

Even still another object of the present invention is to provide a piston ring locating system for conveniently squaring and locating a piston ring positioned within a recipient cylinder.

Lastly, it is an object of the present invention to provide a new and improved piston ring locating system including a resilient ring fabricated in a generally circular configuration having a short height and a length of between about 2 inches and slightly greater than 5 inches with overlapping free ends. One of the ends has a slight bend there adjacent for fitting inside the opposite end. The rings are outwardly biased resiliently to allow varying the circumference of the ring as a function of the cylinder in which it is to be placed. The ring thus forms an interior surface and an exterior surface positionable within the cylinder in which it is to be placed. The ring has a top edge and a bottom edge constituting an abutment surface. Projection means extends outwardly from the exterior surface to a short distance and is adapted to be located on the upper edge of the block of the cylinder with which it is to be utilized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
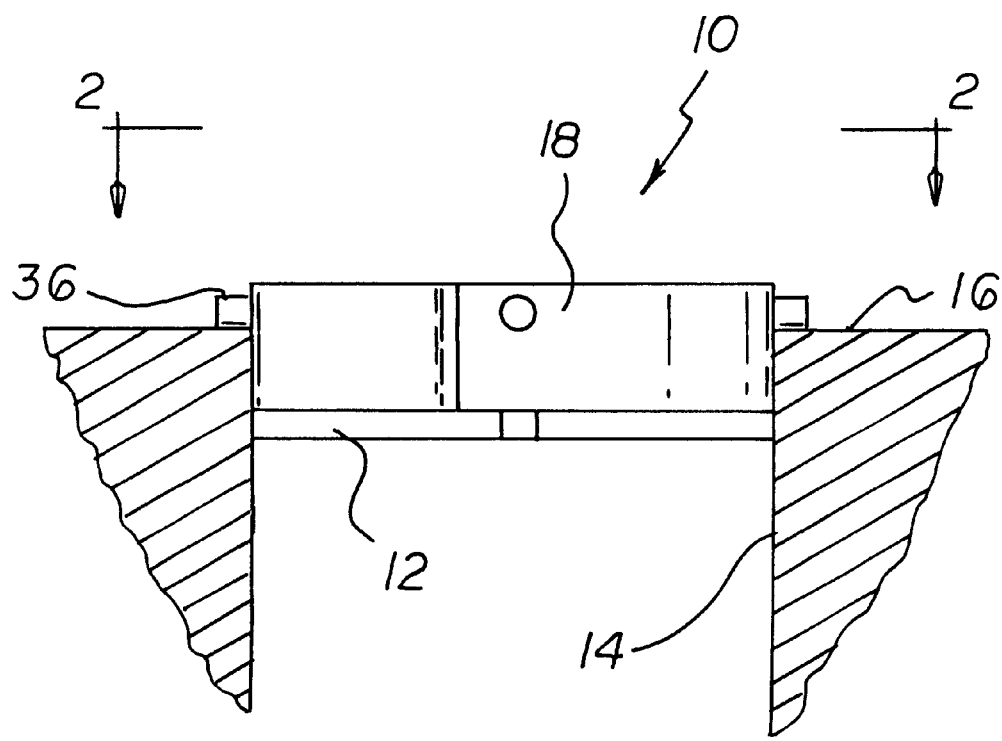
FIG. 1 is a side elevational view of the new and improved piston ring locating system construction in accordance with the principles of the present invention.
Figure 2:
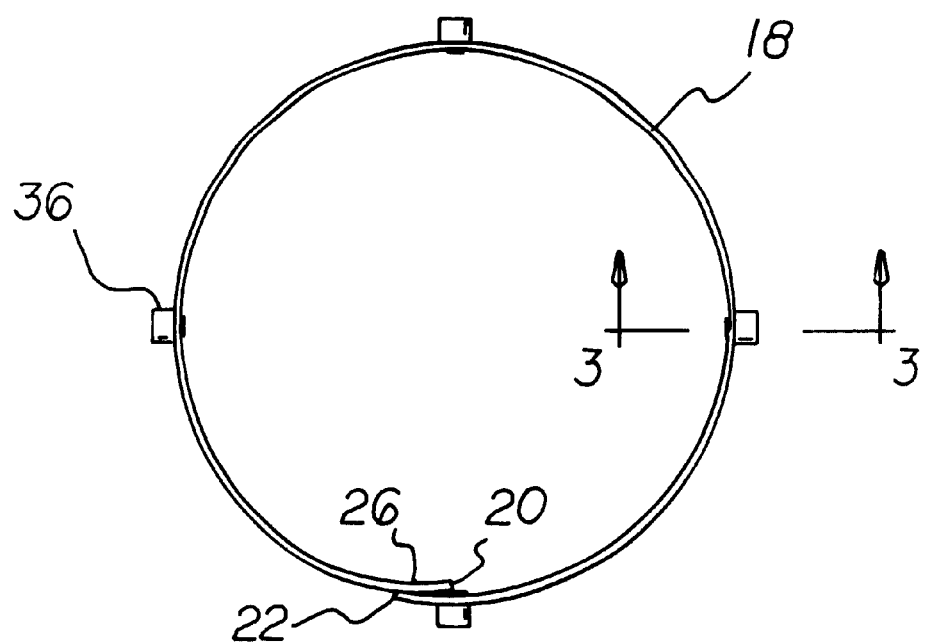
FIG. 2 is a top elevational view of the ring shown in FIG. 1.
Figure 3:
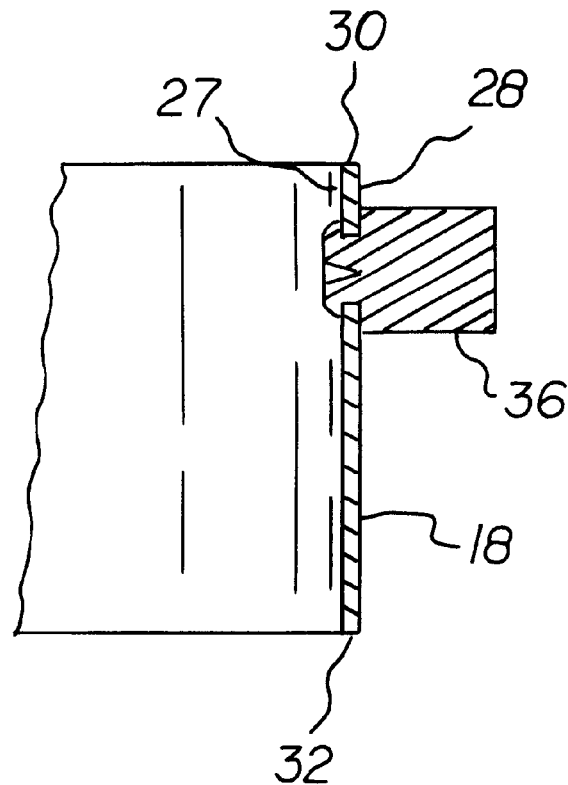
FIG. 3 is a cross sectional view taken along line 3—3 of FIG. 2.
Figure 4:
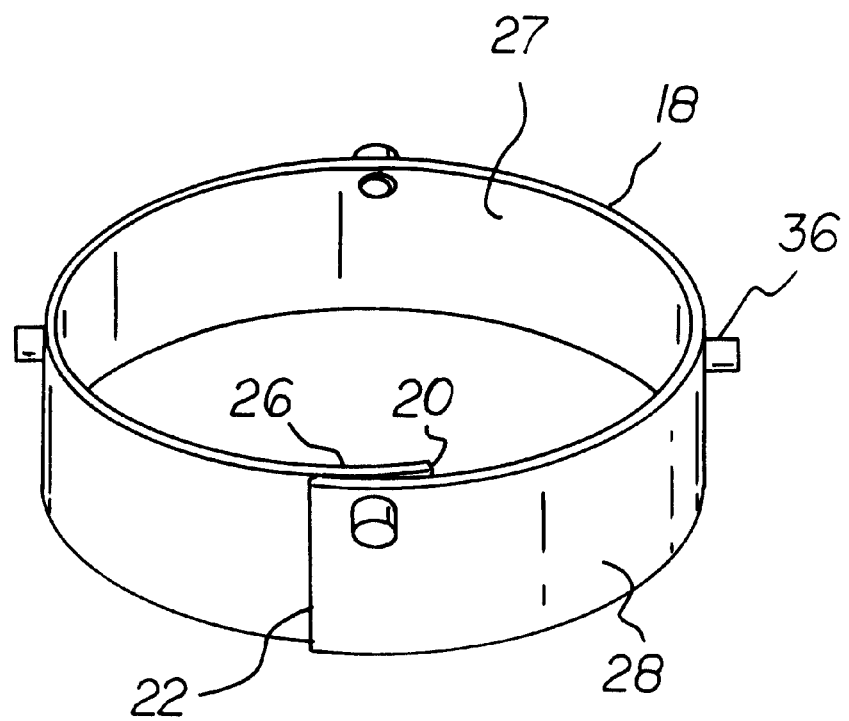
FIG. 4 is a perspective view of the ring shown in the prior figures.

With reference now to the drawings, and in particular to FIG. 1 thereof, the preferred embodiment of the new and improved piston ring locating system embodying the principles and concepts of the present invention and generally designated by the reference numeral 10 will be described.

The present invention, the piston ring locating system 10 is comprised of a plurality of components. Such components in their broadest context include a resilient ring and projection means. Such components are individually configured and correlated with respect to each other so as to attain the desired objective. A recipient cylinder 14 in which a piston ring 12 may be positioned has a free upper edge 16. A plurality of resilient rings 18 are provided. Each ring is fabricated of stainless steel in a generally circular configuration. Each ring has a short height of about 1 inch and a length of between about 2 inches and slightly greater than 5 inches. The preferred sizes are a small ring for 2 to 2.5 inch diameter cylinders, a medium ring for 2.5 to 3.5 inch diameter cylinders, and a large ring for 3.5 to 5.0 inch diameter cylinders. Each ring has overlapping free ends 20, 22. One of the ends 20 has a slight bend 26 there adjacent for fitting inside the opposite end 22. The rings are outwardly biased resiliently to allow varying the circumference of each ring as a function of the cylinder in which it is to be placed. Each ring thus forms an interior surface 27 and an exterior surface 28 positionable within the cylinder in which it is to be placed. Each ring has a top edge 30 and a bottom edge 32 which constitutes an abutment surface.

Projection means 36 are next provided. The projection means extend outwardly from the exterior surface to a short distance. The projection means is adapted to be located on the upper edge of the block of the cylinder with which it is to be utilized to accurately allow the insertion of the ring to a predetermined depth with the bottom edge in contact with the upper edge of a piston ring to effect its proper depth determination within the cylinder as well as the perpendicular squaring of the piston ring with respect to the axis of the cylinder.

Figure 5:
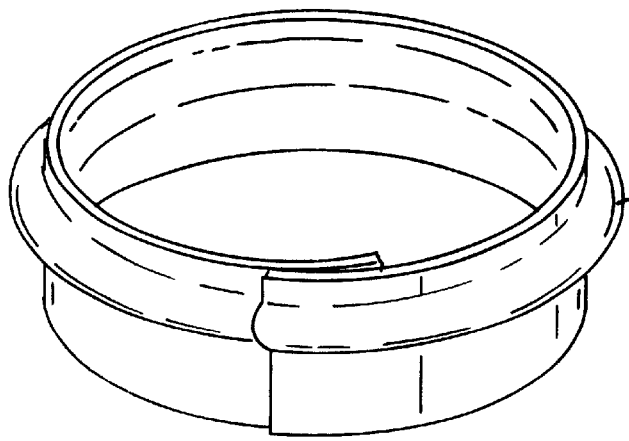
FIGS. 5, 6 and 7 are perspective illustrations of alternate embodiments of the invention.
Figure 6:
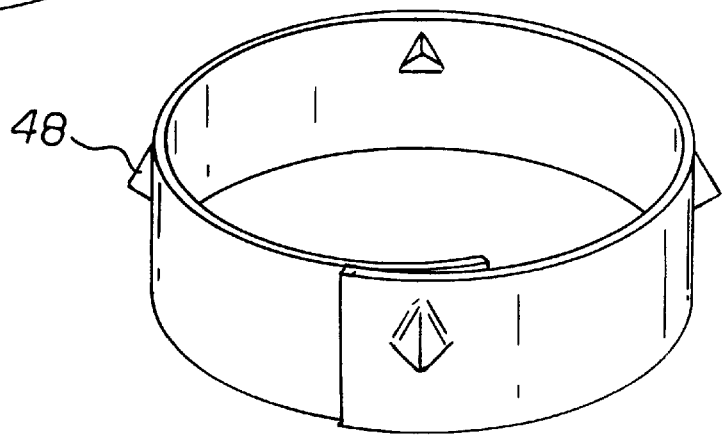
Figure 7:
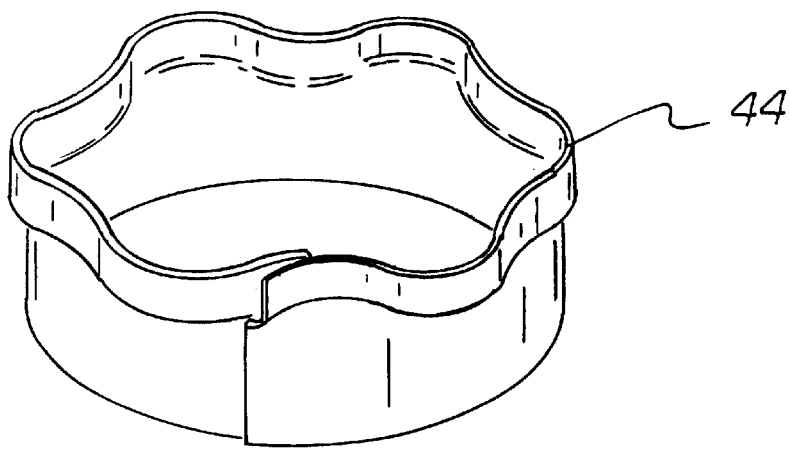

Alternate embodiments of the invention are shown in FIGS. 5, 6 and 7. In the FIG. 5 embodiment the projection means is a semicircular protuberance 46 formed in the periphery of the ring. In the FIG. 6 embodiment, the projection means is formed as a plurality of projections 48 formed through the reshaping of the sidewall. In the last embodiment, that of FIG. 7, the projection means is a plurality of undulations 44 equally spaced around the periphery of the ring each with its axis of curvature parallel with the axis of the ring during operation and use. As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claim as being new and desired to be protected by Letters Patent of the United States is as follow:

1. A piston ring locating system for conveniently and accurately squaring and locating a piston ring positioned within a recipient cylinder having a free upper edge comprising, in combination:

a plurality of resilient rings, each fabricated of stainless steel in a generally circular configuration having a short height of about 1 inch and a length of between about 2 inches and slightly greater than 5 inches, preferably a small ring for 2 to 2.5 inch diameter piston, a medium ring for 2.5 to 3.5 inch diameter cylinders, and a large ring for 3.5 to 5.0 inch diameter cylinders, with overlapping free ends, one of the ends having a slight bend there adjacent for fitting inside the opposite end, the rings being outwardly biased resiliently, to allow varying the circumference of each ring as a function of the cylinder in which it is to be placed, each ring thus forming an interior surface and an exterior surface positionable within the cylinder in which it is to be placed, each ring having a top edge and a bottom edge constituting an abutment surface; and four projection means secured to, and extending outwardly from, the exterior surface to a short distance at about 90 degrees from each other and adapted to be located on the upper edge of the block of the cylinder with which it is to be utilized to accurately allow the insertion of the ring to a predetermined depth with the bottom edge adapted to be in contact with an upper edge of a piston ring to effect its proper depth determination within the cylinder as well as the perpendicular squaring of the piston ring with respect to the axis of the cylinder.

2. A piston ring locating system comprising:

a resilient ring fabricated in a generally circular configuration having a short height and a length of between about 2 inches and 5 inches with overlapping free ends, one of the ends having a slight bend there adjacent for fitting inside the opposite end, the rings being outwardly biased resiliently, to allow varying the circumference of the ring as a function of the cylinder in which it is to be placed, the ring thus forming an interior surface and an exterior surface positionable within the cylinder in which it is to be placed, the ring having a top edge and a bottom edge constituting an abutment surface; and projection means secured to, and extending outwardly from, the exterior surface to a short distance adapted to contact at least four points of the upper edge of the block of the cylinder with which it is to be utilized.

3. The system as set forth in claim 2 wherein the ring has a length of between 2 and 2½ inches.

4. The system as set forth in claim 2 wherein the ring has a length of between 2½ and 3½ inches.

5. The system as set forth in claim 2 wherein the ring has a length of between 3½ and 5 inches.

6. The system as set forth in claim 2 wherein the ring when utilized is in a circular configuration.

7. The system as set forth in claim 2 wherein the projection means is a plurality of short cylinders equally spaced around the periphery of the ring each with its axis perpendicular to the axis of the ring during operation and use.

8. The system as set forth in claim 2 wherein the projection means is a semicircular protuberance formed in the periphery of the ring.

9. The system as set forth in claim 2 wherein the projection means is formed as a plurality of projections formed through the reshaping of the sidewall.

10. The system as set forth in claim 2 wherein the projection means includes undulations.

11. The system as set forth in claim 2 wherein the diameter of the ring is several times greater than its height.

12. The system as set forth in claim 2 wherein the center of the ring is open.

* * * * *